United States Patent [19]

Inoue

[11] Patent Number: 5,382,781

[45] Date of Patent: Jan. 17, 1995

[54] DATA READER FOR NON-CONTACT AND CONTACT IC CARDS

[75] Inventor: Takeshi Inoue, Itami, Japan

[73] Assignee: Mitsubishi Denki Kabushiki Kaisha, Tokyo, Japan

[21] Appl. No.: 141,021

[22] Filed: Oct. 26, 1993

[30] Foreign Application Priority Data

Oct. 27, 1992 [JP] Japan .................................. 4-289014

[51] Int. Cl.6 ................................................ G07B 15/02
[52] U.S. Cl. .................................... 235/384; 235/440
[58] Field of Search ....................... 235/382, 384, 440; 343/867, 742

[56] References Cited

U.S. PATENT DOCUMENTS 5,124,535  6/1992  Kocznar .............................. 235/380

Primary Examiner—Davis L. Willis
Assistant Examiner—Karl D. Frech
Attorney, Agent, or Firm—Leydig, Voit & Mayer

[57] ABSTRACT

A data processing apparatus has a card inserting unit provided with a card inserting port for a contact type card which is disposed inside of a loop-shaped antenna through which data is transmitted to and received from a non-contact type card. Even if various kinds of cards are accessed, the sequence of accessed cards cannot be different from the sequence of cards being processed. With this arrangement, in a data processing apparatus capable of commonly using two or more kinds of cards including the contact type card and non-contact type card, the sequence of users utilizing the apparatus cannot be different from the sequence of data being processed.

4 Claims, 8 Drawing Sheets

DATA READER FOR NON-CONTACT AND CONTACT IC CARDS

BACKGROUND OF THE INVENTION

1. Field of the Invention

The present invention relates to a data processing apparatus capable of commonly using cards such as a magnetic card, IC card and the like which need direct contact to deliver data and non-contact type cards in which data is delivered through a radio waves, and more specifically, to a card inserting unit of the data processing apparatus.

2. Description Of The Related Art

Although magnetic cards and IC cards which need contact with a magnetic head, electrode terminal probe or the like for the delivery of data have come into wide use as prepaid cards, passes and the like, non-contact type cards which deliver data through radio waves and do not need contact are also being gradually introduced. Recently a data processing apparatus capable of commonly using magnetic cards and IC cards (hereinafter, referred to collectively as a contact type card and the non-contact type card has begun to be used. An example of this type of the apparatus is an automatic ticket checking machine (hereinafter, referred to as an automatic gate).

FIGS. 6A and 6B schematically show a conventional automatic gate for commonly processing a contact type card and non-contact type card, wherein FIG. 6A is an upper plan view of the automatic gate and FIG. 6B is a perspective side view schematically showing the internal arrangement of the main body 1a of the automatic gate. In the Figures, numeral 1 designates the automatic gate which can process both a magnetic card and non-contact type card and is composed of main bodies 1a and 1b between which a passenger walks in the direction of an arrow A; numeral 2 designates a magnetic card, numeral 3 designates a card inserting port for the magnetic card 2; numeral 4 designates a card sensor for sensing the magnetic card 2 inserted; numeral 5 designates a fetching roller for fetching the magnetic card 2 into the main body 1a and feeding the same into the interior thereof; numeral 6 designates a reading magnetic head for reading the data of the magnetic card 2; numeral 7 designates a writing magnetic head for writing data to the magnetic card 2; numeral 8 designates a display unit for displaying the result of the data processing of the magnetic card 2; numeral 9 designates a card feed roller for discharging the magnetic card 2 to a discharge port 10, and numeral 11 designates the gate of the gating machine to be opened and closed by a gate drive unit 12 as shown by an arrow. FIG. 6A shown the state that the gate 11 is closed to stop a passenger. Numeral 13 designates a non-contact type card; numeral 14 designates an antenna for transmitting data to and receiving data from the non-contact type card 13; and numeral 15 designates a main control unit including a CPU, memory (not shown) and the like for controlling the above respective components to thereby control the fetching and discharging of the magnetic card 2, data processing of the magnetic card 2 and non-contact type card 13, and further the display of the result based on the result of the data processing and the opening/closing of the gate 11.

Note, although the automatic gate shown in FIGS. 6A and 6b is actually provided with a human sensor, a sensor for discriminating an adult from a child and the like in addition to the above components, these components are not shown. In addition, the inner arrangement shown in FIG. 6B schematically shows the function thereof.

Further, FIG. 7 is a flowchart showing a process for processing the magnetic card 2 as a contact type card and FIG. 8 is a flowchart showing a process for processing the non-contact type card 13.

Next, operation will be described.

First, the process for processing the magnetic card will be described with reference to FIGS. 6A, 6B and 7. A user or a passenger approaches to the automatic gate 1 and inserts the magnetic card 2 into the inserting port 3 (step S1). At this time, the card sensor 4 senses the insertion of the card and transmits a signal to the main control unit 15 (step S2). The fetching roller 5 is rotated in response to the signal and moves the card 2 to the position of the reading magnetic head 6 (step S3). The reading head 6 reads the data of the magnetic card 2 and transmits the data to the main control unit 15 (step S4). The main control unit 15 discriminates and determines or calculates the truth/falsehood of the data of the card, passing conditions thereof and the like, determines whether the card is valid or invalid (step S5). When the card is valid, the result of the determination and the result of a predetermined calculation is written to the card 2 through the writing magnetic head 7 (step S6), and at the same time the results are displayed on the display unit 8 (step S7). Then, the feed roller 9 is driven in rotation to discharge the card 2 to the discharge port 10 (step S8). At this time, the passenger moves from the card inserting port 3 to the card discharge port 10, a signal based on the result of the determination effected by the main control unit 15 is transmitted to the gate drive unit 12, and thus when the card is valid, the gate 11 is opened, whereas when the card is invalid, the gate 11 is closed as shown in FIG. 6A. With this arrangement, the passenger is permitted to pass through the gating machine or prohibited from passing therethrough (step S9). Finally, the passenger takes out the card 2 from the card discharge port 10 (step S10).

Next, a process for processing the non-contact type card will be described with reference to FIGS. 6A, 6B and 8. Since the non-contact type card 13 has means for transmitting a signal to and receiving a signal from the antenna 14 or a coil through radio waves or electromagnetic induction, a passenger need only cause the non-contact type card 13 to approach the antenna 14 (step S11). Since the antenna 14 produces a trigger signal, the non-contact type card 13 approaching the antenna 14 is enabled by the trigger signal from the antenna 14 (steps S12–S13). The enabled card 13 transmits the ticket examination data contained therein to the antenna 14 (step S14). The data received by the antenna 14 is discriminated and determined by the main control unit 15 in the same way as the magnetic card 2 (steps S15–S16). Then, the result of the discrimination and determination is transmitted to the non-contact type card 13 through the antenna 14 as well as being displayed on the display unit 8 (steps S17–S18). Further, the gate is opened or closed by controlling the gate drive unit 12 depending upon whether the card is valid or not which is determined based on the result of the discrimination and determination (step S19). Then, the passing operation of the card 13 is completed (step S20).

In this type of the automatic gate, the inserting port 3 of the magnetic card 2 and the antenna 14 of the non-contact type card 13 are located at different positions on the main body 1a of the automatic gate 1.

Incidentally, although the magnetic card came into wide use first and then the non-contact type card developed recently and is being gradually introduced, the magnetic card needs contact, whereas the non-contact type card has the feature that it does not need contact and it suffices only to "hold" or "pass" the non-contact type card over the gating machine (e.g., only to cause the non-contact type card to approach the machine to a distance of about 10–20 cm). Thus, the non-contact type card is advantageous in that it need not be specially taken out from a pass holder, purse, handbag or the like, etc. As a result, there is a tendency that the non-contact type card is applied to the machine used for the magnetic card in the same way as the magnetic card.

The conventional data processing apparatus (e.g., the automatic gate) in which the contact type card and non-contact type card can be commonly used is arranged as described above. Nevertheless, since the magnetic card and non-contact type card have a completely different data delivery system and arrangement of components, the card inserting port for the magnetic card and the antenna for the non-contact type card are disposed on the main body of the automatic gating machine or buried therein at different positions. Therefore, there is a possibility that the sequence of passengers may be reversed to the sequence for processing cards in a rush hour when passengers crowd the automatic gate.

In the gating machine shown in FIGS. 6A and 6B, the card inserting port 3 for the magnetic card is located on the near side and the antenna 14 for the non-contact type card is located on the far side with respect to a path shown by the arrow A. Therefore, there is a possibility that although a passenger with the non-contact type card first enters the gating machine and advances to the antenna 14 to cause the non-contact type card to approach thereto, another passenger with the magnetic card 2 following the above passenger may put the card into the card inserting port 3 before the non-contact type card approaches to the antenna 14.

On the other hand, even if the position of the card inserting port 3 and that of the antenna 14 are reversed in FIGS. 6A and 6B, there is a possibility that the sequence in which respective passengers put the cards into or causes them to approach the gate machine is reversed to the sequence of the passengers. Since the main control unit of the gate machine preferentially processes a card which is sensed first or a card whose data is received first, a problem arises in that the sequence of passengers is reversed to the sequence for processing cards and thus a fault check of cards arises, with the result that passengers making use of the gate machine are greatly troubled and a large confusion is caused in a rush hour in which tickets cannot be normally examined.

SUMMARY OF THE INVENTION

An object of the present invention made to solve the above problem is to provide a card inserting port and a data processing apparatus using the card inserting port by which the sequence of users is not reversed to the sequence for processing cards in an apparatus in which contact type cards and non-contact type cards are commonly used.

According to one aspect of the present invention, there is provided a data processing apparatus capable of commonly using two or more kinds of cards including a contact type card and non-contact type card, which comprises a loop-shaped antenna for transmitting data to and receiving data from the non-contact type card; a card inserting port for the contact type card formed in the loop-shaped antenna; card fetching and discharging means for fetching and discharging the contact type card inserted into the card inserting port; data reading and writing means for reading and writing the data of the contact type card; and control means connected to the data reading and writing means to process data as well as connected to the card fetching and discharging means to control the fetching and discharging of the contact type card.

According to another aspect of the present invention, there is provided a data processing apparatus according to the first aspect of the present invention which further comprises a kind of card notification means connected to the control means for signifying the kind of card processed by at least one of a display and audio sound.

According to still another aspect of the present invention, there is provided a card inserting unit of an apparatus arranged to provide a card inserting port for a contact type card at the center of a loop-shaped antenna for transmitting data to and receiving data from a non-contact type card, the apparatus including a data processing apparatus such as an gate machine, cash dispenser and the like and a telephone and further various kinds of automatic vending machines and the like.

According to the data processing apparatus of the first aspect of the present invention, since the card inserting port for the contact type card and the antenna for the non-contact type card are located at the same position and the card inserting port is formed in the loop-shaped antenna, for example, when a previous user inserts a contact type card into the inserting port, it is impossible for a succeeding user to cause a non-contact type card to approach the antenna at the same time or before the insertion of the contact type card, whereas when the previous user tries to cause a non-contact type card to approach to the antenna, it is impossible for the succeeding user to insert a contact type card into the inserting port at the same time or before the approach of the non-contact type card to the antenna, and thus the sequence of users cannot be different from the sequence for processing cards and no confusion arises.

According to the data processing apparatus of the second aspect of the present invention, since the kind of a processed card is further signified by at least one of a display and audio sound, a user can confirms whether his or her card is being processed in a proper sequence or not by at least one of a visual notification and audio notification.

Further, according to the third aspect of the present invention, since the card inserting port for a contact type card is formed on the inside of the loop-shaped antenna for a non-contact type card in the apparatus including a data processing apparatus such an automatic gate machine, cash dispenser and the like, a telephone and further various kinds of automatic vending machines and the like capable of commonly using the contact type card and non-contact type card, even if different kinds of cards are accessed at random, the sequence of the cards to be processed is not reversed.

BRIEF DESCRIPTION OF THE DRAWINGS

FIG. 1A and FIG. 1B schematically show the data processing apparatus of an embodiment of the present invention, wherein FIG. 1A shows an upper plan view of the apparatus and FIG. 1B shows a perspective side view thereof;

FIGS. 3A and 3B schematically show the data processing apparatus of another embodiment of the present invention, wherein FIG. 3A shows an upper plan view of the apparatus and FIG. 3B schematically shows the inner arrangement thereof;

FIGS. 5A and 5B schematically show the card inserting unit of the present invention, wherein FIG. 5A is a front view schematically showing the card inserting unit and FIG. 5B is a perspective side view thereof.

FIGS. 6A and 6B schematically show the conventional data processing apparatus, wherein FIG. 6A shows an upper plan view of the apparatus and FIG. 6B is a perspective side view schematically showing the inner arrangement thereof;

DESCRIPTION OF PREFERRED EMBODIMENTS

Embodiment 1

Figure 1A:
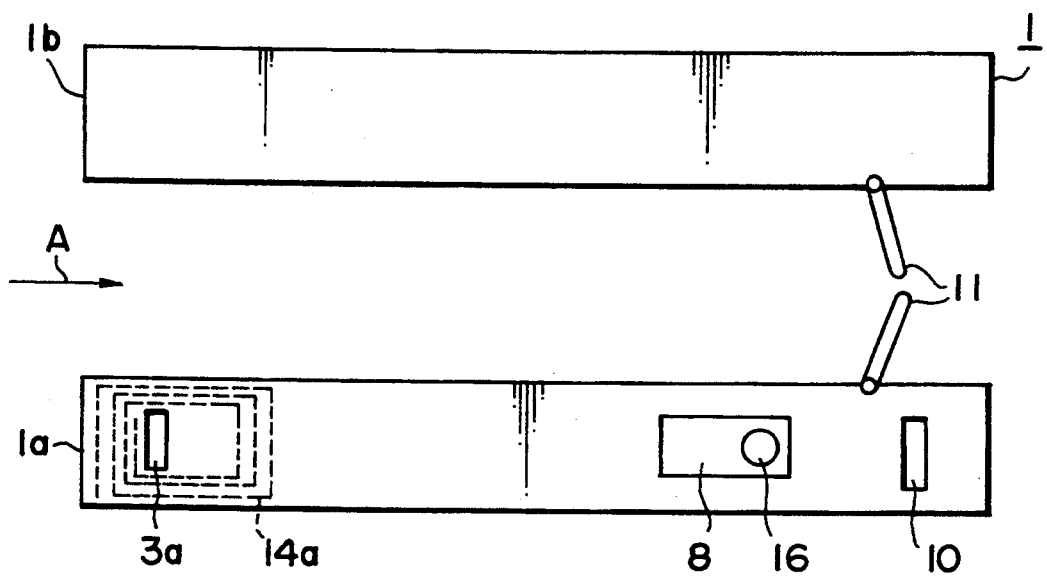
Figure 1B:
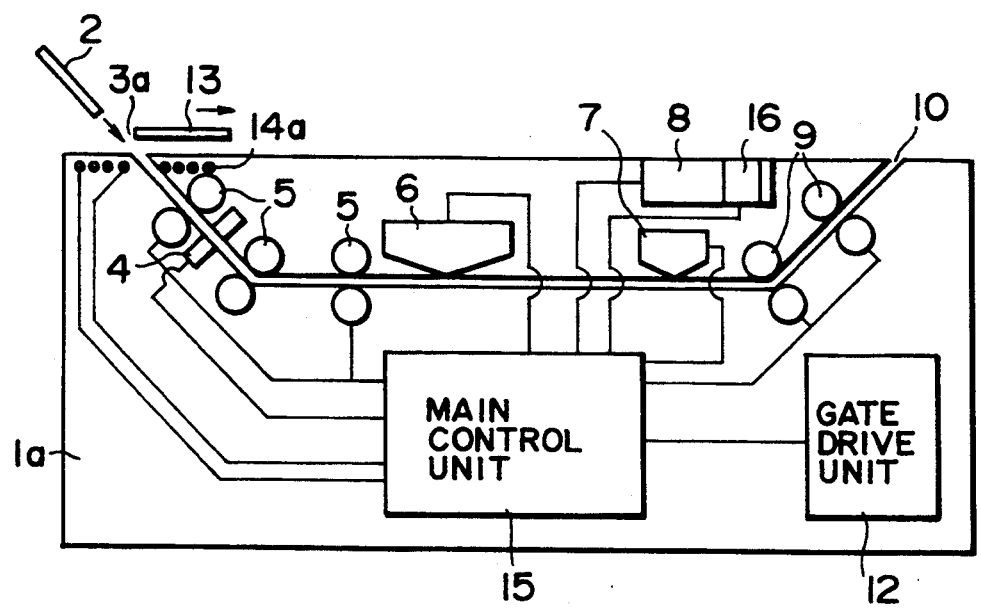

FIGS. 1A and 1B schematically show the automatic gate as a data processing apparatus of an embodiment according to the present invention, wherein FIG. 1A is an upper plan view of the automatic gate and FIG. 1B is a perspective side view schematically showing the inner arrangement of the main body 1a of the automatic gate. In the Figures, numeral 1 designates the automatic gate machine capable of processing a magnetic card and non-contact type card and composed of main bodies 1a and 1b and a passenger walks between the main bodies 1a and 1b in the direction shown by an arrow A; numeral 2 designates the magnetic card; numeral 3a designates a card inserting port for the magnetic card 2. Further, numeral 13 designates the non-contact type card and numeral 14a designates a loop-shaped antenna (coil) for the non-contact type card 13, Then, the card inserting port 3a and antenna 14a are arranged such that the card inserting port 3a is located in the loop-shaped antenna 14a. Numeral 4 designates a card sensor; numeral 5 designates a fetching roller; numeral 6 designates a reading magnetic head; numeral 7 designates writing magnetic head; numeral 8 designates a display unit; numeral 9 designates a feed roller; numeral 10 designates a discharge port; numeral 11 designates a gate; numeral 12 designates a gate drive unit; numeral 16 designates an audio output unit composed of, for example, a buzzer, audio generator or the like for signifying the kind of card by an audio sound; and numeral 15 designates a main control unit including a CPU, memory (not shown) and the like which controls the above respective components to thereby control the fetching and discharge of the magnetic card 2, processing of the data of the magnetic card 2 and non-contact type card 13, and further the display of the result obtained from the data processing, opening and closing of the gate 11 and the like. The audio output unit 16 is also connected to the main control unit 15. Note, the fetching roller 5 and feed roller 9 are part of a card fetching and discharge means. Further, the reading magnetic head 6 and writing magnetic head 7 are part of a data reading and writing means. In addition, the main control unit 15 is part of a control means. The display unit 8 and audio output unit 16 are part of a kind of card notification means. The card inserting unit includes the antenna 14a and the card inserting port 3a located on the inside of the antenna.

Further, although the automatic gate shown in FIG. 1 is actually provided with a human sensor and a sensor for discriminating an adult from a child in addition to the above components in the same way as the conventional one, these components are not shown. In addition, the inner arrangement shown in FIG. 1B schematically shows the function thereof.

A holder (passenger) of the magnetic card 2 or non-contact type card 13 approaches the automatic gate machine 1 and inserts the magnetic card 2 into the card inserting port 3a or causes the non-contact type card 13 to approach the antenna 14a. Since a trigger radio wave is always produced from the antenna 14a to enable the non-contact type card 13, when the non-contact type card 13 approaches the antenna 14a to a distance of about 10–20 cm, the non-contact type card 13 is enabled. This distance is determined such that, for example, when a previous passenger inserts the magnetic card 2 into the inserting port 3a, a succeeding passenger is prohibited from causing the non-contact type card 13 to approach (holding the card over) the antenna 14a at the same time or before the insertion of the magnetic card 2, whereas when the previous passenger tries to cause the non-contact type card 13 to approach the antenna 14a, the succeeding passenger is prohibited from inserting the magnetic card 2 into the inserting port 3a at the same time or before the approach of the non-contact type card 13 to the antenna 14a. Therefore, the sequence of passengers cannot be different from the sequence of cards.

Figure 2:
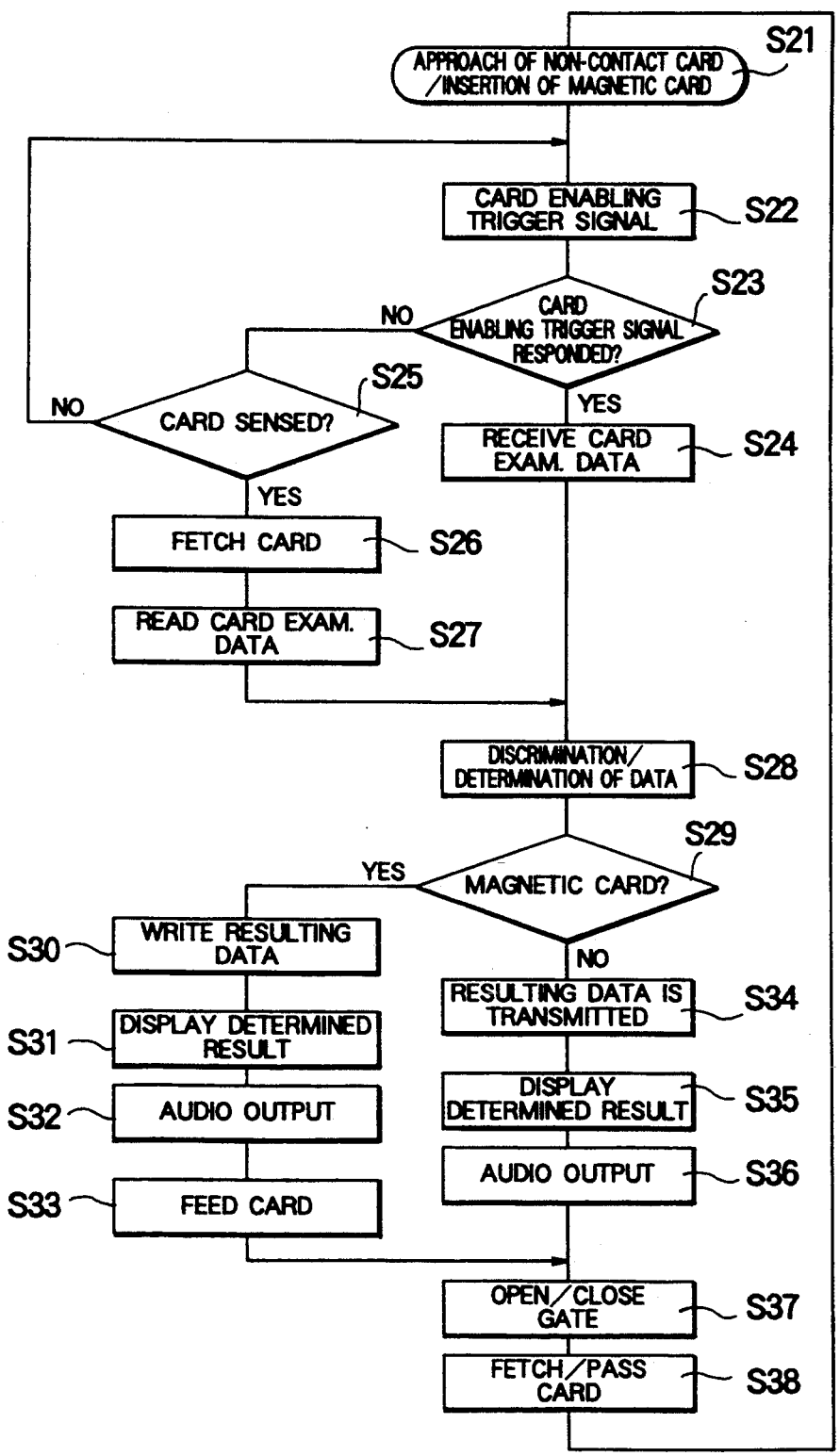
FIG. 2 is a flowchart showing a process for processing the cards in the apparatus shown in FIG. 1.

FIG. 2 shows a flowchart of the process for processing cards in the automatic gate machine shown in FIGS. 1A and 1B. The operation of the gate machine will be described with reference to FIG. 2.

First, a passenger either causes the non-contact type card 13 to approach to the antenna 14a or inserts the magnetic card 2 into the inserting port 3a (step S21). An enabling trigger signal is transmitted from the antenna 14a to the non-contact type card 13 (step S22), and when the non-contact type card 13 approaches thereto, it responds to the trigger signal (step 23). Thereafter, the antenna 14a receives the examination data of the non-contact type card 13 (step S24). On the other hand, when the magnetic card 2 is inserted into the inserting port 3a, it is sensed by the card sensor 4 (step S25) and then the card 2 is fetched by the rotation of the fetching roller 5 (step S26). Next, the reading magnetic head 6 reads the data of the magnetic card 2 (step S27). Then, the input data of the magnetic card 2 or non-contact type card 13 is discriminated and determined by the main control unit 15 in the same way as the conventional apparatus (step S28).

Next, when the processed card is a magnetic card 2 (step S29), the writing magnetic head 7 writes resulting data to the magnetic card 2 (step S30). Further, the main control unit 15 determines whether the card is valid or invalid, and the result of the determination and the kind of the card are displayed on the display unit 8 (step S31). The kind of the card is displayed on the display unit 8 as, for example, "magnetic" or "non-contact" to indicate the classification of the magnetic card and non-contact type card so that a user can confirm that he used a proper card. At the same time, the kind of the processed card is signified by an audible sound such as for example, a buzzing sound (step S32). Then, the magnetic card 2 is discharged to the discharge port 10 by the feed roller 9 (step S33).

On the other hand, in the case of the non-contact type card 13, resulting data is transmitted to the non-contact type card 13 through the antenna 14a (step S34). Further, the result of the determination is to whether the card is valid or invalid effected by the main control unit 15 and the kind of the processed card are displayed on the display unit 8 (step S35) and at the same time the kind of the processed card is signified through the audio output unit 16 by an audio sound (step S36).

The gate 11 is opened or closed by the gate drive unit 12 depending upon the result of the processing (whether the card is valid or invalid) (step S37), and in the case of the magnetic card 2, it is taken out from the discharge port 10 by the passenger and finally the passing of the passenger or the card is completed (step S38).

Note, the kind of the processed card may by signified by any one of the display unit 8 or the audio output unit 16. Further, the audio output unit 16 may produce an audio sound including both the result of the determination and the kind of the card.

Embodiment 2

Figure 3A:
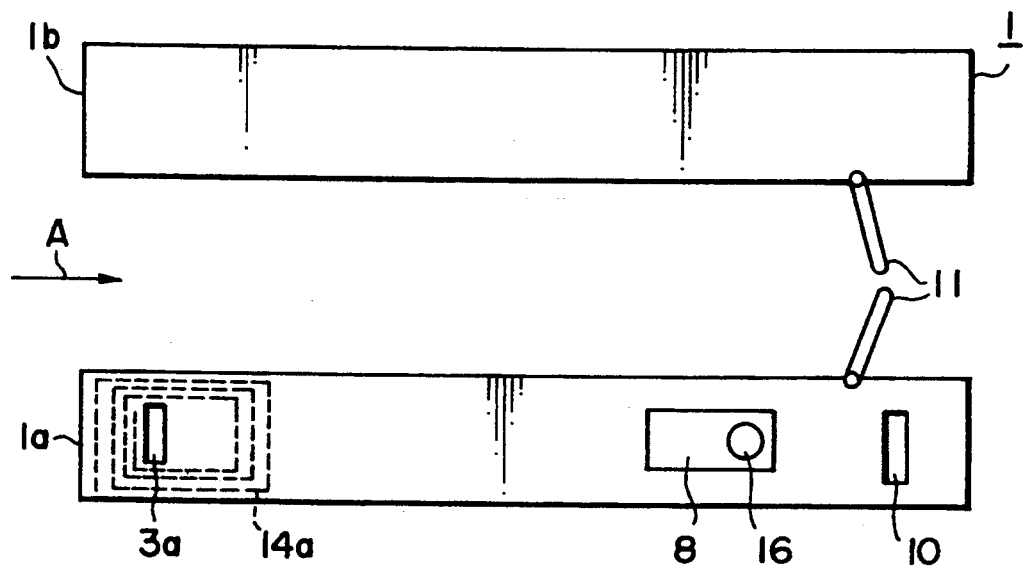
Figure 3B:
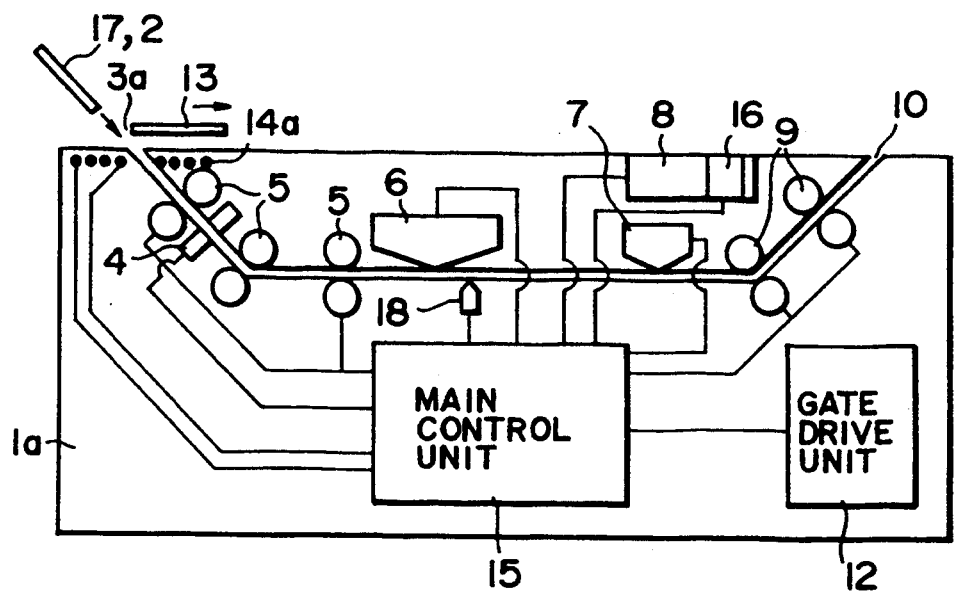
Figure 4:
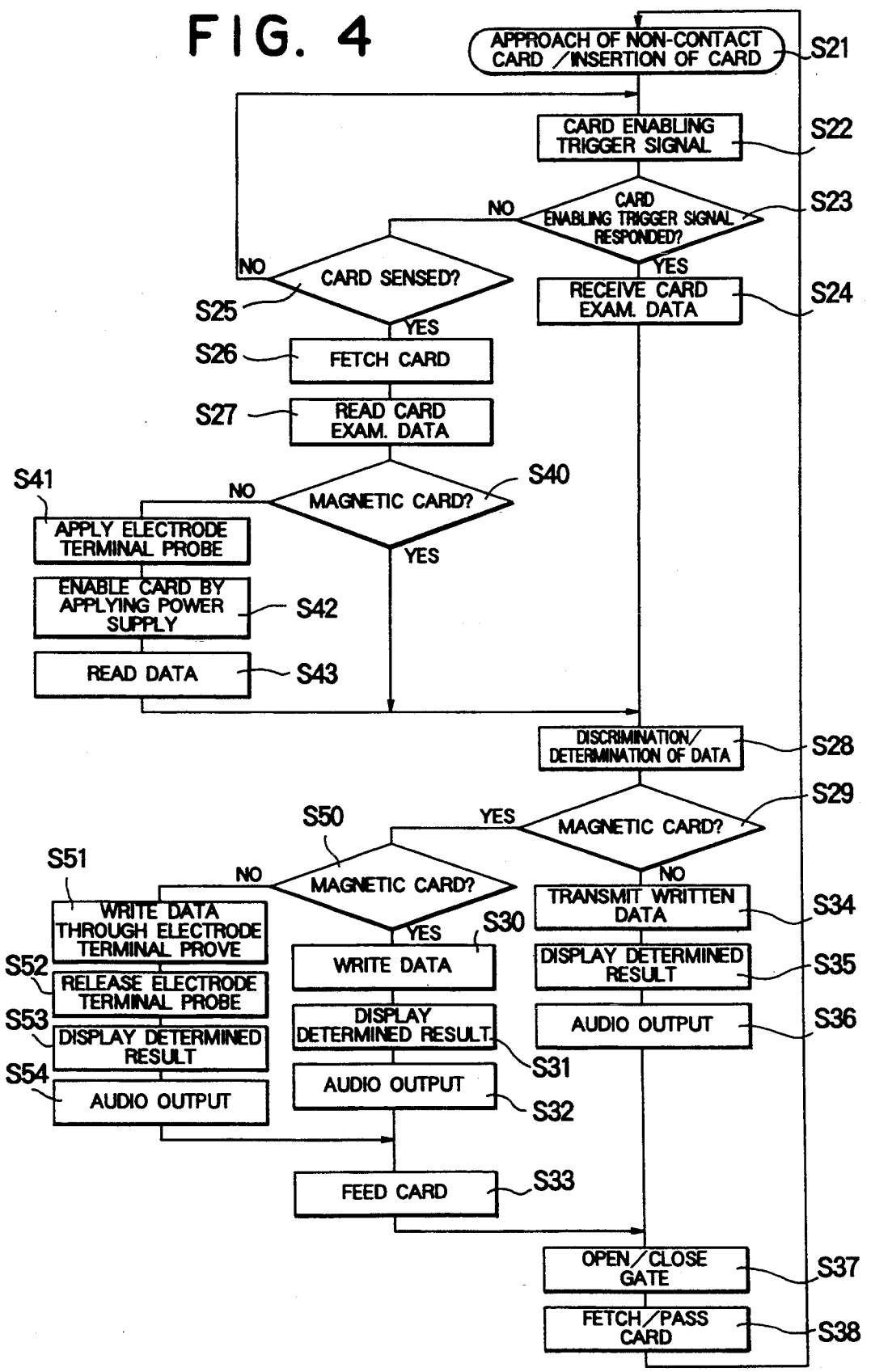
FIG. 4 is a flowchart showing a process for processing the cards in the apparatus shown in FIG. 3.

Although an automatic gate machine commonly using the magnetic card and non-contact type card is described with reference to FIG. 1, an automatic gate machine capable of commonly using a contact type IC card together with the magnetic card and a non-contact type card can be also provided. FIGS. 3A and 3B show the embodiment of this type of the automatic gate machine. FIGS. 3A and 3B schematically show the automatic gate machine as a data processing apparatus according to another embodiment of the present invention, wherein FIG. 3A is an upper plan view of the automatic gate machine and FIG. 3B is perspective side view schematically showing the inner arrangement of the main body 1a of the automatic gate machine. In the figures, numeral 17, commonly shown with the magnetic card 2, designates an IC card containing an IC module therein and having the same size as that of the magnetic card 2. The IC card 17 has an external electrode terminal (not shown) to output data to and input data from an external device. Numeral 18 designates a movable electrode terminal probe for inputting and outputting data by coming into contact with the IC card fetched into the automatic gate machine 1. The IC card 17 is in the process of being standardized by International Standard Organization (ISO) and assigned the number of ISO 7816. FIG. 4 shows a flowchart of the process for processing the card of the automatic gate shown in FIGS. 3A and 3B. The operation of the automatic gate will be described with reference to FIG. 4.

The flowchart shown in FIG. 4 is arranged such that the processing of the contact type magnetic card 2 executed in the flowchart of FIG. 2 is separated from the processing of the magnetic card 2 and that of the IC card 17. The same numerals as used in the steps of FIG. 2 are used to designate the same or corresponding steps in FIG. 4 and the detailed description thereof is omitted. When any one of the IC card 17 and magnetic card 2 as the contact type card is inserted into an inserting port 3a, the card is sensed by a card sensor 4 (step S25) and fed to the positions of a reading magnetic head 6 and the electrode terminal probe 18 by a fetching roller 5 (step S26). Next, the magnetic head 6 reads data (step S27).

When the card is determined not to be the magnetic card 2 because the magnetic head 6 cannot read the data or the read data is not the data of the magnetic card (step S40), the card is determined to be the IC card (alternately, the card sensor 4 may be provided with a function for determining a kind of card from different thickness thereof). Thus, the electrode terminal probe 18 is applied to the external electrode terminal (not shown) of the IC card (step S41) and the IC card 17 is enabled by being connected to a power supply (step S42). Thereafter, the data of the IC card 17 is read through the probe 18 (step S43).

Further, in the case of the non-contact type card 13, the data of the card is received in accordance with steps S21–S24 in the same way as FIG. 2.

Then, the data of the card is discriminated and determined in the same way as step S28 of FIG. 2.

Thereafter, the kinds of the cards are classified (steps S29, S50), and the non-contact type card 13 is processed at steps S34–S38 in the same way as FIG. 2 and the magnetic card 2 is processed in the sequence of steps S30–S33 and steps S37, S38, whereas in the case of the IC card, data is written thereto through the electrode terminal probe 18 (step S51) and when the data has been written, the probe 18 is released from the IC card (step S52). Then, a result is displayed on a display unit 8 based on the result of the determination executed by the main control unit 15 (step S53). At the same time, it is signified to a passenger that the kind of the card is the IC card by at least one of the display unit 8 and an audio output unit 16 (step S54). Thereafter, the same processing as that of the magnetic card 2 is executed at steps S33, S37 and S38.

Embodiment 3

Although the embodiments of the present invention are described by putting special emphasis on the automatic gate machine in FIGS. 1A, 1B, 3A and 3B, generally speaking, the non-contact type card can be commonly used in a terminal where the magnetic card or IC card is used and a system to which the terminal is applied.

Figure 5A:
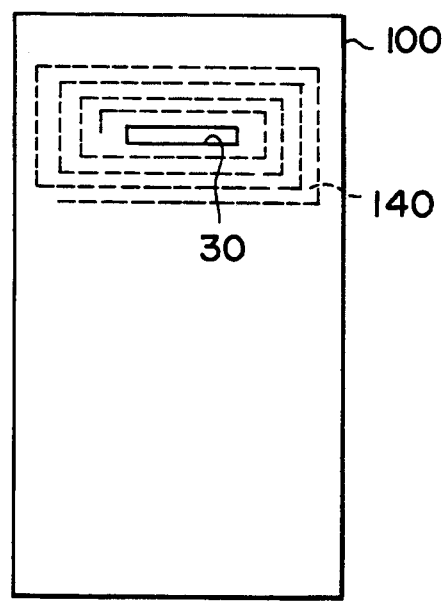
Figure 5B:
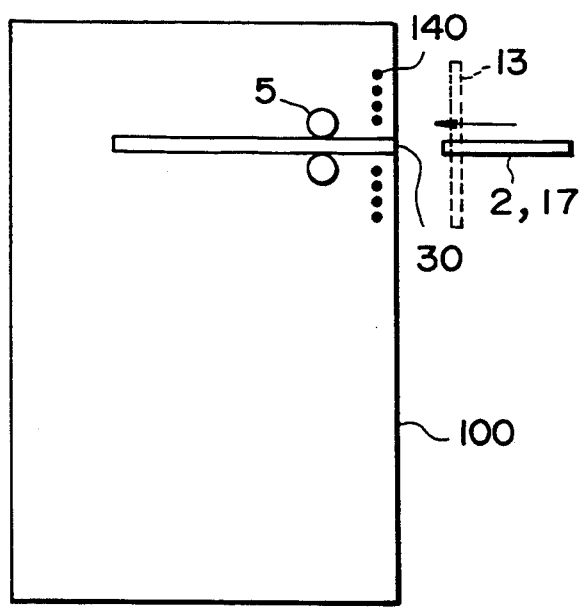
Figure 6A:
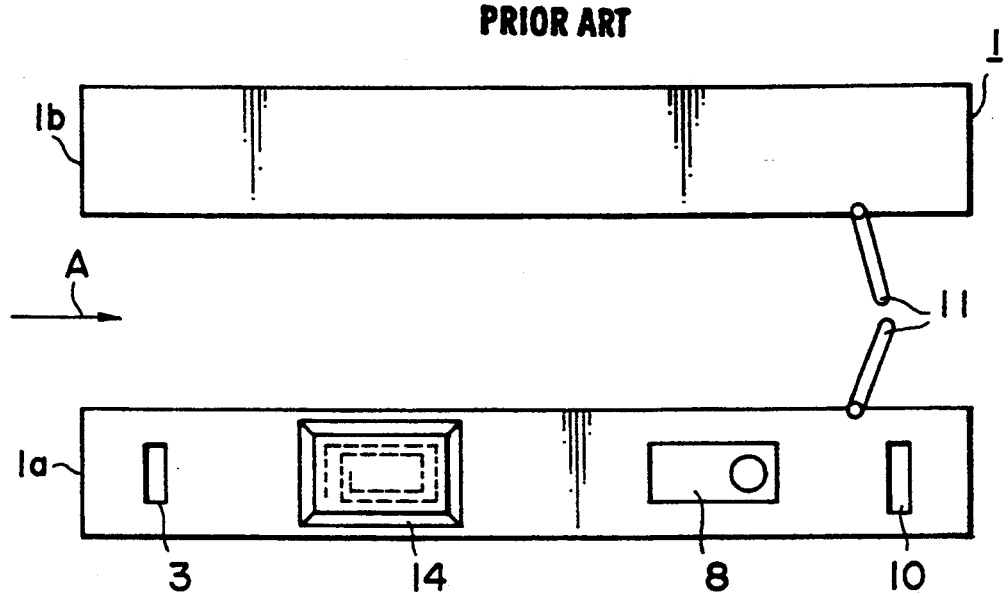
Figure 6B:
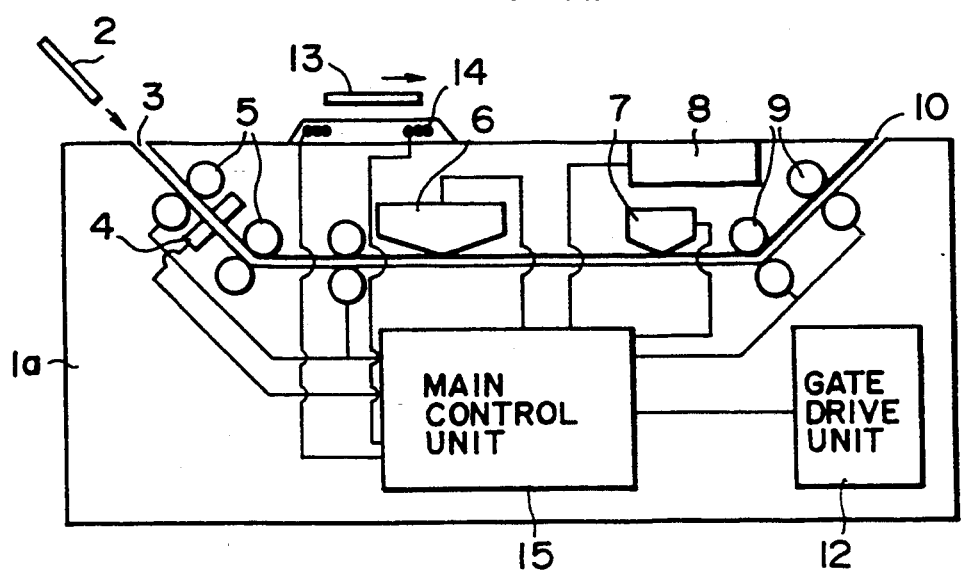
Figure 7:
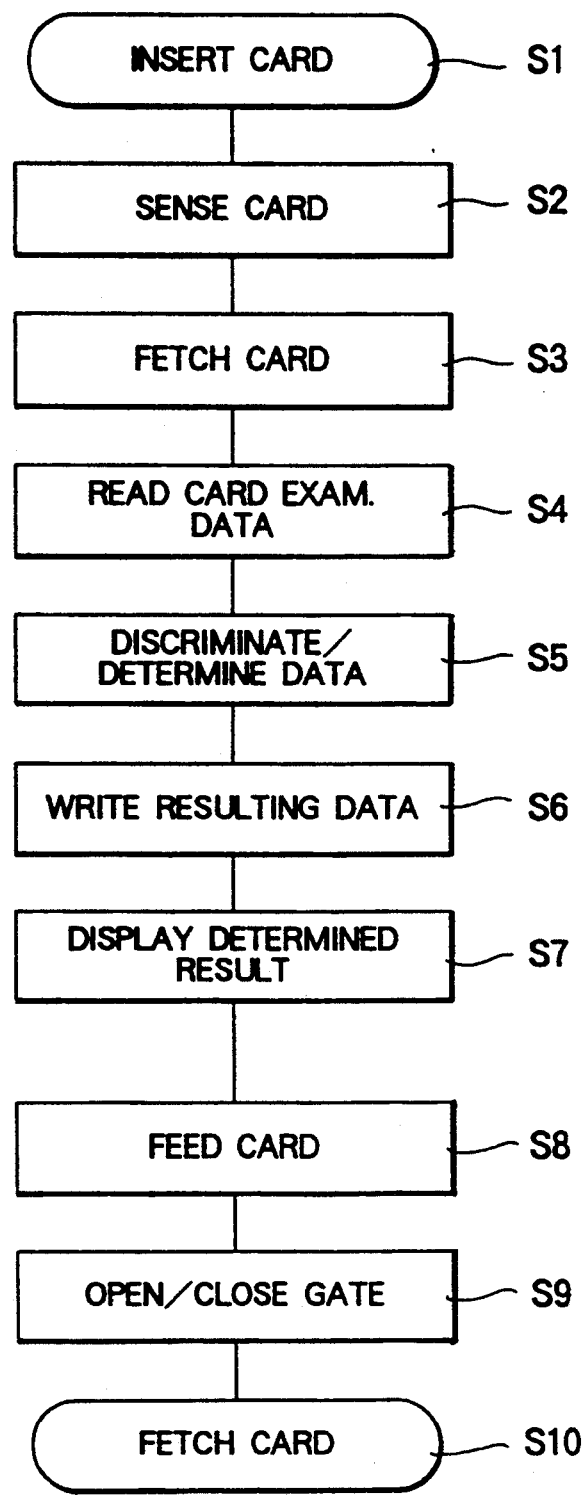
FIG. 7 is a flowchart showing a process for processing a magnetic card in the apparatus shown in FIGS. 6A and 6B; and, FIG. 8 is a flowchart showing a process for processing a non-contact card in the apparatus shown in FIGS. 6A and 6B.
Figure 8:
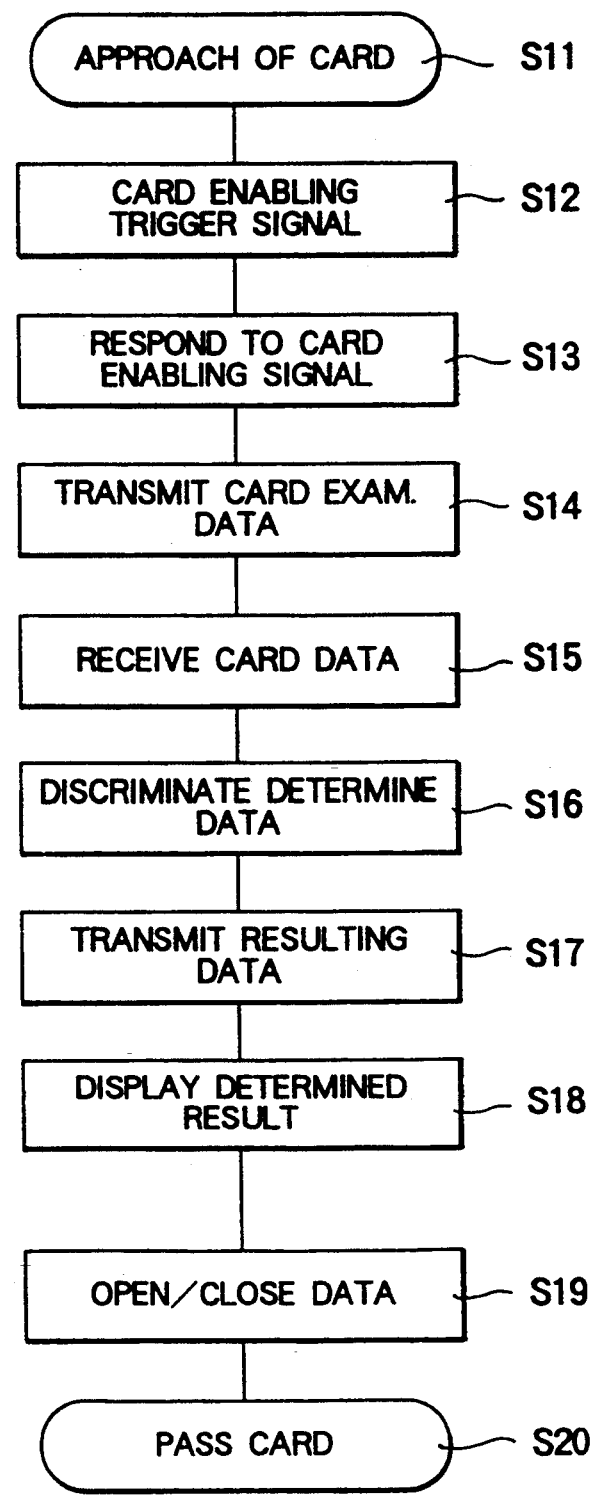

As a further embodiment, FIGS. 5A and 5B schematically show the card inserting unit for a POS (point of sales) devices cash dispenser (CD), telephone, various kinds of automatic vending machines and the like, wherein FIG. 5A shows a front view and FIG. 5B shows a perspective side view.

An antenna 140 has a loop shape around the outer periphery of the inserting port 30 of a device 100 into which a magnetic card 2 or IC card 17 is inserted and the non-contact type card 13 is caused to approach to the antenna 140 in the same manner by which the magnetic card 2 or IC card is handled, and thus the device 100 can also process the data of the non-contact type card 13. Therefore, the inserting port, antenna and processing mechanism for a different kind of the magnetic card, IC card and non-contact type card, each having a different function can be gathered at a single position, and thus no inconvenience is caused by the different kinds of cards.

Further, with the aforesaid arrangement of the card inserting port, various kinds of cards can be processed in a proper sequence. Note, no electrically conductive material must be used on the inside of the antenna coil for non-contact type cards to improve the characteristics thereof.

As described above, according to the data processing apparatus of the first aspect of the present invention, since the card inserting port for the contact type card and the antenna for the non-contact type card are located at the same position and the card inserting port is formed on the inside of the loop shaped-antenna, the sequence of users cannot be different from the sequence for processing cards and thus a highly reliable data processing apparatus can be provided.

Further, particularly as in the embodiment shown in FIGS. 3A and 3B, since the interfaces for the various kinds of cards such as the antenna for the non-contact type card, the magnetic heads for the magnetic card, the electrode terminal probe for the IC card and the like are provided with the single data processing apparatus and the data processing mechanism is shared, there can be obtained a compact data processing apparatus capable of processing many kinds of cards.

Further, according to the data processing apparatus of the second aspect of the present invention, since the kind of a processed card is signified by at least one of the display and audio sound, a user can confirms whether his or her card is processed in a proper sequence or not by at least one of visual and audio notification.

Further, according to the third aspect of the present invention, since the card inserting port for a contact type card is formed at the center of the loop-shaped antenna for a non-contact type card in various kinds of apparatus such a cash dispenser, telephone, various kinds of automatic vending machines and the like capable of commonly using a contact type card and a non-contact type card, cards accessed at random can be processed in a proper sequence and thus the reliability of the apparatus is improved.

What is claimed is:

1. A data processing apparatus commonly using a contact type card and a non-contact type card comprising:
    a loop-shaped antenna for transmitting data to and receiving data from a non-contact type card;
    a card inserting port for receiving a contact type card and located within said loop-shaped antenna;
    card fetching and discharging means for fetching and discharging a contact type card inserted into said card inserting port;
    data reading and writing means for reading and writing data into a contact type card; and
    control means connected to said data reading and writing means and said antenna for processing data and to said card fetching and discharging means to control the fetching and discharging of contact type card.

2. The data processing apparatus according to claim 1 comprising card notification means connected to said control means for signifying the kind of card processed by at least one of a visual display and audio sound.

3. A card inserting unit of an apparatus using a contact type card and a non-contact type card comprising:
    a loop-shaped antenna for transmitting data to and receiving data from a non-contact type card; and
    a card inserting port for receiving a contact type card and located within said loop-shaped antenna.

4. An automatic gate machine using contact and non-contact type passes and prepaid cards comprising:
    a loop-shaped antenna for transmitting data to and receiving data from a non-contact type card;
    a card inserting port for receiving a contact type card and located within said loop-shaped antenna;
    card fetching and discharging means for fetching and discharging a contact type card inserted into said card inserting port;
    data reading and writing means for reading and writing data into a contact type card;
    control means connected to said data reading and writing means and said antenna for processing data and to said card fetching and discharging means to control the fetching and discharging of a contact type card; and
    card notification means connected to said control means for signifying the kind of card processed by at least one of a visual display and audio sound.

* * * * *